United States Patent
Osmanbasic et al.

(10) Patent No.: US 9,981,827 B2
(45) Date of Patent: May 29, 2018

(54) SAFETY BRAKE FOR AN ELEVATOR

(71) Applicant: Inventio AG, Hergiswil (CH)

(72) Inventors: Faruk Osmanbasic, Sins (CH); Josef A. Muff, Hildisrieden (CH); Nicolas Gremaud, Moris Plains, NJ (US)

(73) Assignee: INVENTIO AG, Hergiswil (CH)

( * ) Notice: Subject to any disclaimer, the term of this patent is extended or adjusted under 35 U.S.C. 154(b) by 0 days. days.

(21) Appl. No.: 15/036,514

(22) PCT Filed: Nov. 7, 2014

(86) PCT No.: PCT/EP2014/074047
§ 371 (c)(1),
(2) Date: May 13, 2016

(87) PCT Pub. No.: WO2015/071188
PCT Pub. Date: May 21, 2015

(65) Prior Publication Data
US 2016/0289045 A1    Oct. 6, 2016

(30) Foreign Application Priority Data

Nov. 15, 2013    (EP) .................................... 13193196

(51) Int. Cl.
*B66B 5/22* (2006.01)
*F16D 59/00* (2006.01)
(Continued)

(52) U.S. Cl.
CPC ............... *B66B 5/22* (2013.01); *F16D 59/00* (2013.01); *F16D 63/008* (2013.01);
(Continued)

(58) Field of Classification Search
CPC ........ F16D 59/00; F16D 59/02; F16D 63/008; F16D 2121/14; F16D 2121/20; F16D 2121/22; F16D 2125/58; F16D 2125/64; F16D 2125/66; B66B 5/16; B66B 5/18; B66B 5/22; B66B 5/24
(Continued)

(56) References Cited

U.S. PATENT DOCUMENTS 1,581,459 A * 4/1926 Lindquist .................. B66B 5/22
                                                     187/360
2,716,467 A * 8/1955 Callaway .................. B66B 5/22
                                                     187/376
(Continued)

FOREIGN PATENT DOCUMENTS

CN    86103763 A    12/1986
CN    12172888 A    5/1999
(Continued)

*Primary Examiner* — Thomas J Williams
(74) *Attorney, Agent, or Firm* — William J. Clemens; Shumaker, Loop & Kendrick, LLP

(57) ABSTRACT

A safety brake for an elevator includes a brake element or a brake wedge, a guide element, and a setting device. The brake element or the brake wedge is borne movably on the guide element. The safety brake has an activating element, which, upon activation of the safety brake, can be brought into mechanical engagement with the brake element or the brake wedge to act on a guiderail to stop an associated elevator car.

26 Claims, 4 Drawing Sheets

(51) Int. Cl.
*F16D 63/00* (2006.01)
*F16D 121/14* (2012.01)
*F16D 121/20* (2012.01)
*F16D 125/58* (2012.01)

(52) U.S. Cl.
CPC ...... *F16D 2121/14* (2013.01); *F16D 2121/20* (2013.01); *F16D 2125/58* (2013.01)

(58) Field of Classification Search
USPC ............ 188/65.1, 67, 171, 70 B, 72.2, 72.7; 187/368, 372
See application file for complete search history.

(56) References Cited

U.S. PATENT DOCUMENTS 3,282,383 A * 11/1966 Chasar ...................... B66B 5/22
187/372
8,312,972 B2 * 11/2012 Gremaud ................. B66B 5/22
187/371

FOREIGN PATENT DOCUMENTS

| | | | |
|---|---|---|---|
| CN | 1357488 A | 7/2002 | |
| CN | 2526306 Y | 12/2002 | |
| CN | 2623667 Y | 7/2004 | |
| DE | 102006043890 A1 * | 3/2008 | .............. B66B 5/22 |
| EP | 1431230 A1 | 6/2004 | |
| EP | 1749780 A1 | 2/2007 | |
| EP | 1902993 A1 | 3/2008 | |
| GB | 249743 A * | 4/1926 | .............. B66B 5/18 |
| WO | 2013165339 A1 | 11/2013 | |

* cited by examiner

SAFETY BRAKE FOR AN ELEVATOR

FIELD

The present invention relates to a safety brake for an elevator, a method for moving a brake element of a safety brake, and an elevator with a safety brake.

BACKGROUND

From the prior art, safety brakes for elevators are known which consist essentially of a brake housing with a brake wedge. As a rule, the safety brakes are arranged in a pair arrangement on an elevator car or a counterweight of the elevator. The elevator car and the counterweight are guided along guiderails. In case of need, the safety brake can act on the guiderails in order to stop the elevator car and/or the counterweight. The safety brakes are controlled by speed governors or safety controls. This safety control, or the speed control, monitors an operation of the elevator and, in case of need, actuates the safety brake when, for example, an excessively high travel speed is detected. As a rule, this actuation should take place rapidly. Various efforts have been undertaken to improve the engagement times of such safety brake. In addition, in the prior art, there are approaches to fitting such devices with an automatic resetting system.

EP 1 902 993 A1, for example, shows a safety brake which, instead of a wedge, has a friction roller. The friction roller moves in a motion link, which is held by an electromagnet. When the device is triggered, the electromagnet is de-energized. The latter releases the motion link, which, via a spring, together with the friction roller, is pressed against a guiderail of an elevator. Between the motion link and the magnet, a gap occurs. Through displacement of the friction roller into an engaged position, the motion link is again pressed in the direction of the magnet, whereby the magnet can be re-energized and holds the motion link in the rest position again. Upon release of the safety brake, the friction roller is pulled by a spring mechanism into its original position. The spring that presses on the motion link, and the spring that pulls the friction roller back, act in opposite directions. This is particularly disadvantageous, since neither of the two springs can fully develop its force.

A further disadvantage is that it takes relatively long until the safety brake is in an engaged position and can brake the elevator.

SUMMARY

An objective of the invention is to overcome the disadvantages of the prior art. In particular, a safety brake for an elevator shall be made available which shortens the engagement time of the safety brake. In addition, a simple resetting of the safety brake shall be made possible.

Such a safety brake for an elevator contains at least one brake element. In addition, a guide element is provided on which the brake element is borne in a movable guide. The guide element is movable between a rest position and a brake initial position. In the rest position, the brake element is distanced from an opposing surface, which is preferably formed by a guiderail of the elevator. In the brake initial position, the brake element is in contact with the opposing surface. The safety brake further contains a setting device with an actuating element. The actuating element acts on the guide element in order to move the guide element from the rest position into the brake initial position. The safety brake contains at least one additional activating element, which is different from the setting device. Upon activation of the safety brake, the activating element is in mechanical engagement with the brake element or can be brought into mechanical engagement with the brake element. By means of the activating element, with at least one movement component, the brake element is moved in a direction along its brake surface towards an engaged position.

Preferably, the brake element is a brake wedge. The brake wedge has a brake surface. In the brake initial position, with its brake surface the brake wedge is in contact with the opposing surface. A brake wedge as brake element is advantageous since, by means of brake wedges, a brake force can be established with simple means, since, after a pressing-on of the brake wedge, or of the brake surface of the brake wedge, against the opposing surface, the brake wedge is automatically pulled into a correspondingly formed wedge aperture of the safety brake.

Here and hereafter, an "engaged position" is understood to be a position of the brake element, or of the brake wedge, in which the brake wedge adopts an end position, wherein the end position is defined, for example, by a boundary of the travel path of the brake wedge. In the engaged position, the brake surface of the brake wedge is, by definition, in mechanical engagement with the opposing surface. In particular, the travel path can also be bounded by the brake wedge adopting a wedged position, in which it is no longer movable. This is particularly the case when a travel velocity is so low that a corresponding engagement body already comes to a standstill during the engagement process.

The movable guide element can be embodied in such manner that, during the braking operation, it can be moved back into its original rest position, the guide element being movable back into its original rest position, particularly in interaction with the brake wedge. The displaceable bearing of the brake wedge on the guide element favors this, and thereby reduces wear and friction.

Such a device with an additional activating element allows an early forced movement of the brake wedge in the direction of its engaged position. The engagement time of the safety brake is thereby shortened, since the movement of the guide element, together with the brake wedge that is borne on the guide element, in the direction of the brake surface, and the movement of the brake wedge by means of the activating element in the direction of the engaged position, take place simultaneously. Thereby, a passby play between the brake surface of the brake wedge and the opposing surface can be rapidly reduced. The brake surface of the brake wedge is thereby rapidly moved from the rest position into the brake initial position and correspondingly brought into contact with the opposing surface. Through a press-on force that is effected by the actuating element onto the opposing surface, from this moment on, the brake wedge is automatically moved further into the engaged position, since the brake wedge remains attached to the opposing surface. The activating element thereby essentially moves the brake wedge only in the direction of the engaged position until the passby play is eliminated. Self-evidently, the condition for this is that a wedge angle of the brake wedge, and the corresponding form of the brake housing, is chosen small, so that the friction force that is to be expected between the brake surface of the brake wedge and the opposing surface is greater than a resetting force that is effected by the wedge slope.

In order to improve the braking effect, or to provide greater friction, the brake surface can, in particular, have a structurally favorable surface. For example, the brake surface can be provided with a structure, ribs, or a special coating. Self-evidently, a combination is also possible.

In a preferred embodiment, upon activation of the safety brake, the guide element can be brought into mechanical engagement with the activating element. The setting device can then act both on the guide element and on the activating element. Such a mechanical engagement, which, in particular, can be of a mechanical nature, causes a forced movement process.

Preferably, the activating element is fastened in swiveling manner to a brake housing of the safety brake. The activating element can be articulated at the guide element. A swivel joint of the individual elements allows precise setting of the safety brake, and the motion sequence and the manner of operation to be precisely matched to each other. A high reproducibility is assured. When the activating element is articulated at the guide element, the activating element can be moved in the manner of a motion-link control. Timed sequences are realized in simple manner.

The activating element can have a roller, which acts on the brake wedge and can thereby create the mechanical engagement with the brake wedge. This is particularly advantageous, since friction losses are avoided. In addition, malfunctions through any entanglement of the individual parts with, or against, each other are ruled out.

The activating element can be embodied as a lever and, in particular, have a curved contour. The curved contour allows the brake wedge also to move if the arrangement is designed, or must be designed, for example, so that the brake wedge is not directly accessible, or comes to rest behind a contour, for example, of the guide element.

The activating element can have an articulation point and, in particular, an articulation axle, which is suitable to act as articulation point for the guide element. Such an articulation point is essentially positioned between a swivel axle of the activating element and the roller that acts on the brake wedge. Through the laws of levers, such an embodiment and arrangement of the activating element enables correspondingly large travel distances to be attained.

Preferably, the guide element is fastened to the brake housing in swiveling manner about a guide axle. A guide axle as swivel axle enables a free rotation of the guide element but prevents, for example, an axial displacement of the guide element.

The brake wedge is borne in displaceable manner in a guide on the guide element. Such a guide is preferably embodied as a roller cage. Such roller cages enable accurately fitting manufacture as well as linear guidance without play. Large forces can be absorbed.

The actuating element can comprise at least a holding element and a pressure element. The holding element is preferably embodied as an electromagnet and the pressure element comprises a helical spring. The separation of the actuating element into a holding element and a pressure element avoids the necessity for a bidirectional effect of individual elements. Each element need only act on one side. Dual tasks are thus avoided and the elements need only be designed for unidirectional effect.

The holding element is preferably fastened onto the guide element and swivels with the guide element when the safety brake is activated. Weight forces of the holding element can act in supporting manner when the guide element is swiveled. It is, however, also possible to fasten the holding element onto the brake housing or onto the setting device. Depending on the type of holding element, a configuration can thus be found which is, for example, suitable for auxiliary devices, as electric power supply and suchlike.

The pressure element can be directly or indirectly in mechanical engagement with the guide element. Preferably, the pressure element has a setting device. Through the setting device, the pressure/activation force of the pressure element can be set according to the prevailing operating conditions. A readjustment in case of wear is also possible.

The safety brake can additionally contain a guide plate with a guide contour to guide the brake wedge. An additional guide plate can absorb forces through the guide contour and, for example, transfer them to the brake housing.

Preferably, the brake wedge is borne, and guided, with a guide axle in the guide contour. Such a contour is equivalent to a forced control, which enables the brake wedge to be guided in predefined paths.

It is, however, also conceivable that the guide contour is embodied as a part of the brake housing. A combination of a guide contour in a guide plate, on the one hand, and, in addition, a guide contour in the brake housing, is also conceivable. The drive contour can contain a wedge angle to a working axis of the safety brake. The working axis of the safety brake is then essentially parallel to a movement axis of the elevator.

The guide preferably has a curved contour. The curved contour preferably has a convex curvature to the working axis. In the case of a curved contour, the wedge angle is variable and, in each case, defined as the angle between a tangent of the contour and the working axis. The angle preferably becomes steadily smaller in the direction of the engaged position. A particular advantage of a curved contour is that the engagement time of the safety brake can be additionally shortened. If the contour has a changeable wedge angle, which, at the beginning of the contour, is steeper than towards the end of the contour in the direction of the engaged position, a movement of the brake wedge with the brake surface towards the opposing surface can be forced. Relative to an uncurved contour, a contact of the brake surface with the opposing surface occurs earlier.

In addition, the safety brake can have a brake plate which, in particular, is arranged on a side that is situated opposite to the brake wedge. Preferably, such a brake plate is borne on a yielding element, which yielding element is, in particular, a spring assembly. For the spring assembly, preferably disk-spring assemblies are used. The use of a yielding element on the brake plate enables a braking in which the braking force steadily increases.

Similar to the brake wedge, the brake plate can be provided with a brake lining which has a structure, which, for example, enables increased coefficients of friction. By means of such an arrangement, the braking effect is increased.

Preferably, the safety brake is embodied as a floating-caliper brake. By this means, a force which is central, and, for example, symmetrical on both sides of a guiderail, is assured. It is, however, also possible to execute the safety brake as a fixed-caliper brake, wherein the present elements of the safety brakes are arranged in essentially mirror-image manner relative to a guiderail of an elevator.

It is, for example, conceivable that, in a floating-caliper brake arrangement, the safety brake is provided with a plurality of essentially parallel-positioned brake wedges.

In such an arrangement, an individual activating element is provided, which acts on all brake wedges. It is also possible that each brake wedge has a separate activating element.

Similarly, it is possible for only one guide element to be provided for a plurality of brake wedges. Preferably, however, each brake wedge has separate activating and guiding elements, which belong to the brake wedge.

A further aspect of the invention relates to a method for moving a brake wedge of a safety brake into an engaged position, whereby, with an actuating element of a setting device, a guide element with a displaceable brake wedge that is borne thereon is brought from a rest position into a brake initial position. By means of an additional activating element, with a movement component in a direction along its brake surface, the brake wedge is moved in the direction of an engaged position.

Preferably, for the purpose of activating, or upon activation of, the safety brake, the activating element is brought into mechanical engagement with the guide element. Such a method shortens the engagement time of a safety brake. The forced engagement, or movement, of the brake wedge makes this method extremely well repeatable and calculable.

It is preferred that, through the movement of the brake wedge into the engaged position, the guide element is brought again into the original rest position. When the guide element is already returned to its rest position during the braking operation, the resetting of the safety brake is simplified. Additional resetting devices are not necessary.

Preferably, upon activation of the safety brake, with a pressure element, and particularly preferably with a helical spring, the guide element is moved into the brake initial position. This forced movement additionally shortens the engagement time of the safety brake.

In the time period before activation of the safety brake, in other words, in an operating mode of the elevator, the guide element can be held in the rest position by a holding element. Preferably, such a holding element is an electromagnet, whose current supply is interrupted, for example, upon activation of the safety brake. It is possible, however, instead of the electromagnet, also to use mechanical means, such as latches or catches. Triggering by electrical means, such as a safety control, as well as by mechanical overspeed devices, are both possible.

After attainment of the original rest position, in particular during and after the braking operation, the guide element can be held in the rest position again by a holding element. Even an only brief opening of the holding element enables the safety brake to initiate the braking operation. The braking operation is continued even if the holding element is intentionally, or only inadvertently, again in mechanical engagement with the guide element.

Since, through the movement of the brake wedge, the guide element is brought back into the original rest position, it is assured that, in particular in the event that the holding element is an electromagnet, the energy for the electromagnet can be kept low. This is particularly because, after the resetting, between the electromagnet and the guide element, no, or only a very small, air gap remains, to overcome which only a small magnetic force is required.

A further aspect of the invention relates to an elevator device with a safety brake as described above. In particular, an elevator can be provided with one or more such safety brakes. The activation of the safety brake brakes the elevator in its downward movement and, in particular, halts it. Preferably, activation of the safety brake causes a complete blockage of the elevator in an elevator hoistway.

To release the safety brake, the elevator can be put into operation in known manner. Through a single short trip in the direction opposite to engagement, the safety brake is released. Through the inclined angle of the guide element and its reset position in the rest position, on account of gravity the brake wedge moves back into its original rest position.

DESCRIPTION OF THE DRAWINGS

By reference to figures, which represent exemplary embodiments only, the invention is explained in greater detail below. Shown are in.

DETAILED DESCRIPTION

Figure 1:
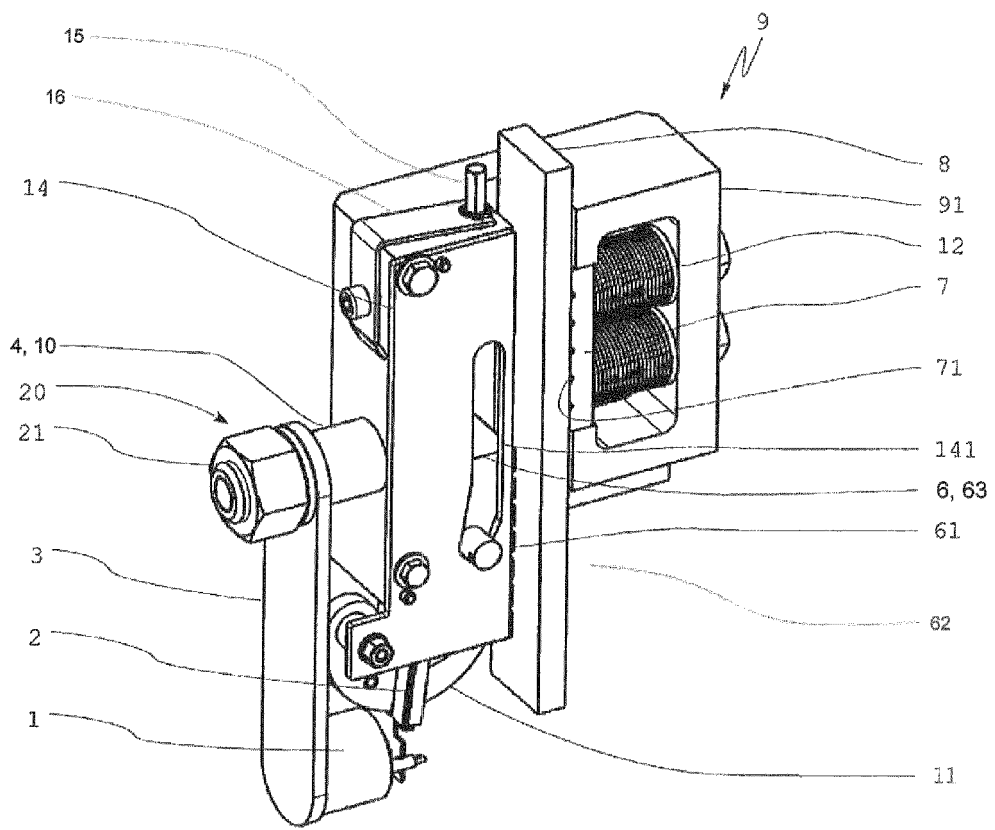
FIG. 1 a three-dimensional view of a safety brake.

FIG. 1 shows a three-dimensional view of an embodiment of a safety brake 9. The safety brake 9 has a brake housing 91 and is essentially embodied as a floating-caliper brake. The details of the fastening of the safety brake 9 to an elevator car, and the embodiment of the bearing of the floating caliper, are not shown here, but are, however, known to the expert. The brake housing 91 is embodied essentially U-shaped and thereby extends on both sides of a guiderail 8. Fastened to the brake housing 91 is a setting device 20, which has a sleeve 10, a spring 4, an electromagnet 1 as holding element, and an adjusting device 21 for setting a compressive force of the spring 4. The setting device 20 acts through an opening in the brake housing 91 on a guide element 2. The setting device 20 has a plate 3, which is mechanically engaged with the electromagnet 1.

Borne in displaceable manner on, or against, the guide element 2 is a brake element 6 in the form of a brake wedge 63 (here only partly visible). Extending on both sides of the brake wedge 63 are guide axles 62. The guide axle 62 that is visible here is guided in a guide contour 141 of a guide plate 14. On the side of the brake wedge that is not visible here, the guide axle 62 is guided in a guide contour of the brake housing, which essentially corresponds with the guide contour 141 of the guide plate 14. By means of the guide contour 141 and the guide axle 62, the brake wedge 63 is held in a lower rest position. In the area of the safety brake 9 that is shown at bottom, there is an activating element 11 (details are visible in FIG. 2). Arranged in the upper area of the brake housing 91 is a settable stop 15. This stop 15 determines an end-position, or limit, of the travel path of the brake wedge. Also in this manner, an engaged position of the brake wedge is determined. The setting of the stop 15 can be secured with a securing plate 16.

On the side of the brake wedge 63 that lies opposite to the guiderail 8, the brake housing 91 has a cage, which has two spring assemblies 12 as yielding element. Borne on the spring assemblies 12 is a brake plate 7.

The brake plate has a brake lining 71, which faces the guiderail 8, and is structured in, for example, a checkered pattern.

Figure 2:
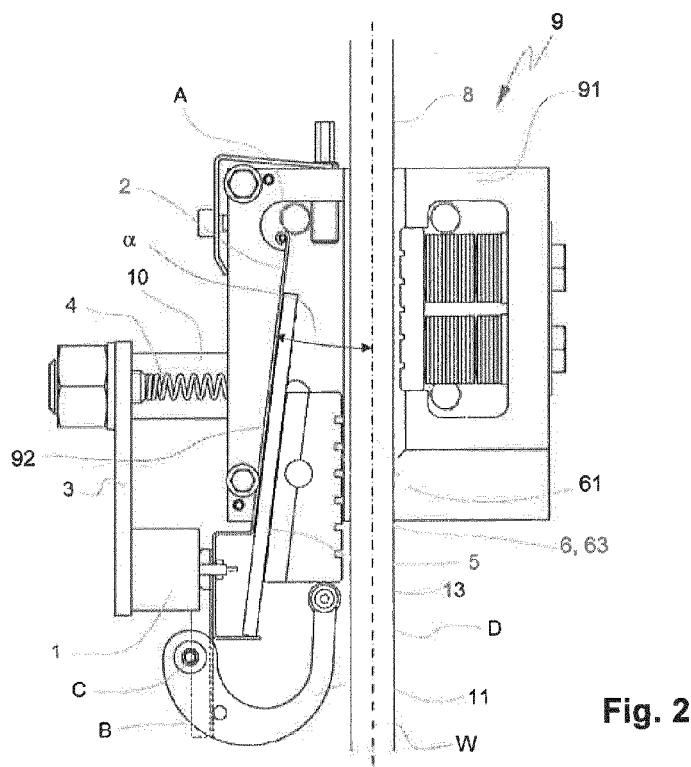
FIG. 2 a partially cut-away view of the safety brake from FIG. 1 in the rest position.

FIG. 2 shows a view of the safety brake 9 of FIG. 1. Identical reference numbers are used for identical parts. For better representation, in this second view, the guide plate 14 is not shown. The view onto the brake wedge 63 remains free. The brake wedge 63 has a brake surface 61, which, in the present instance, is structured in an essentially checkered pattern. Instead of the checkered pattern, also other forms, such as a grooved pattern, or also a brake surface with inset, for example ceramic, brake materials, are possible. Situated in the brake housing 91 is the guide element 2, which is fastened to a turning and swiveling point A. In the rest position, the guide element 2 forms with the working axis W a wedge angle α. Arranged on the guide element 2 is a roller cage 5, through which the brake wedge 63 is borne in displaceable manner on the guide element 2. Shown below the brake wedge 63 is an activating element 11, which, at a swivel axle C, is fastened to the brake housing 91. A roller 13 which is fastened at point D is in mechanical engagement with the brake wedge 63. Situated between the two points C and D is a pivot point B with a pivot axle, which is in mechanical engagement with the guide element 2. The U-shaped embodiment of the activating element 11 enables the engagement of the activating element 11 at the brake wedge 63 without interfering with the guide element 2. The working axis W is essentially an axis that runs in the direction of movement of the elevator.

The guide element 2 consists of a plate which, in order to accommodate the electromagnet, in the lower area is multiply bent in the opposite direction to the engaged position. The roller cage 5 is fastened to the guide element 2 and, in addition, in the lower area of the guide element 2, rests on a further bend of the sheet. The guide element 2 has an additional extension, which is connected with the pivot point B of the activating element 11.

In the present instance, the safety brake 9 of FIG. 2 is shown in an operating state of the elevator and hence in a rest position of the safety brake 9. During the rest position of the safety brake 9, the electromagnet 1 is energized. It thereby adheres to the plate 3, which, via the sleeve 10, is fastened to the brake housing 91. Situated inside the sleeve 10 as pressure element is a helical spring 4. On its opposite side, the electromagnet 1 is fastened to the guide element 2.

In the rest position of the safety brake, the guide element 2, with the roller cage 5 and the brake wedge, rests essentially against a pressure surface 92 of the brake housing 91. Correspondingly, the pressure surface 92 is inclined to the working axis W by the wedge angle α. Essentially, this means that the electromagnet 1 is so set that the guide element 2 rests against the pressure surface 92.

Figure 3:
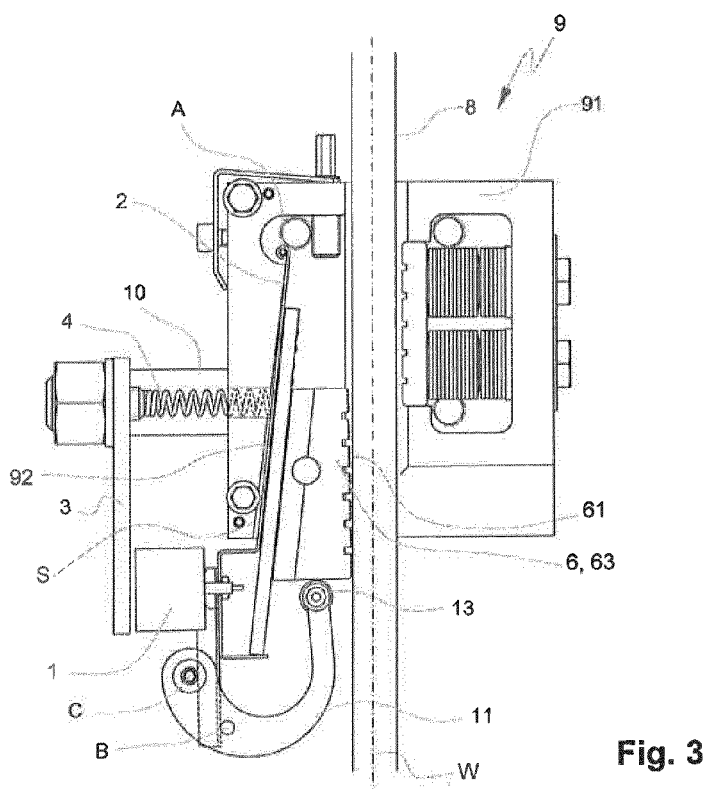
FIG. 3 the safety brake from FIG. 2 shortly after activation.

FIG. 3 shows the safety brake 9 from FIG. 2 shortly after the safety brake 9 has been activated. The helical spring 4, which, through the opening in the brake housing 91, is mechanically engaged with the guide element 2, exerts a pressure on the guide element 2. At that instant at which the electromagnet 1 is de-energized, the mechanical engagement between the electromagnet 1 and the plate 3 is released. The pressure element as helical spring 4 presses on the guide element 2, as a result of which it is swiveled about the swivel axle A. Between the brake housing 91, or pressure surface 92, and the guide element 2, a gap S arises. Together with the brake wedge 63, the guide element 2 is moved in the direction of the guiderail 8. In addition, the guide element 2 acts on the pivot point B of the activating element 11, as a result of which the activating element 11, through its turning point C, with the roller 13, is moved essentially along the working axis W in the direction of an engaged position.

Since the brake wedge 63 is moved in the direction of the engaged position, the distance between the guiderail 8 and the guide element 2, or the brake wedge 63, is shortened, since the brake wedge 63 is borne displaceably on a plane which is inclined to the guide element 2. The distance is additionally reduced by the effect of the pressure element 4, 10. The brake wedge 63 is thereby, until contact of the brake surface 61 with the guiderail 8, already moved in the direction of the engaged position, which significantly shortens the engagement time.

Figure 4:
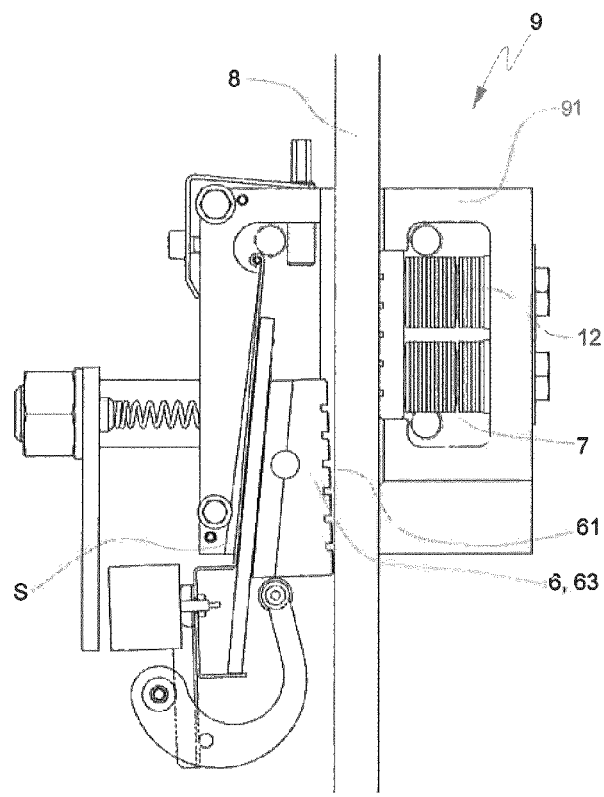
FIG. 4 the safety brake from FIG. 2 after a long activation time in the brake initial position.

FIG. 4 shows the safety brake 9 from FIG. 2 shortly after the brake wedge 63 has entered into mechanical engagement with the guiderail 8. Relative to the position of FIG. 3, the gap S has enlarged. Through the action of the activating element 11 and the already arisen frictional effect between the brake lining 61 and the guiderail 8, the brake wedge 63 is driven further into the wedge gap. Since the safety brake 9 is embodied as a floating-caliper brake, the brake housing 91 moves relative to the guiderail 8 in the direction of the brake wedge 63, as a result of which the brake plate 7 enters into mechanical engagement with the guiderail 8. The further downward movement of the elevator drives the brake wedge 63 further into the wedge gap. Because of the effect of the brake wedge, which is pulled into the wedge gap, the guide element 2 is pushed back into its rest position, and the disk springs 12, upon which the opposite brake plate 7 is borne, are slowly compressed, and thereby determine a resulting press-on force, with which the brake lining 61, and the oppositely situated brake plate 7, are pressed onto the guiderail.

Figure 5:
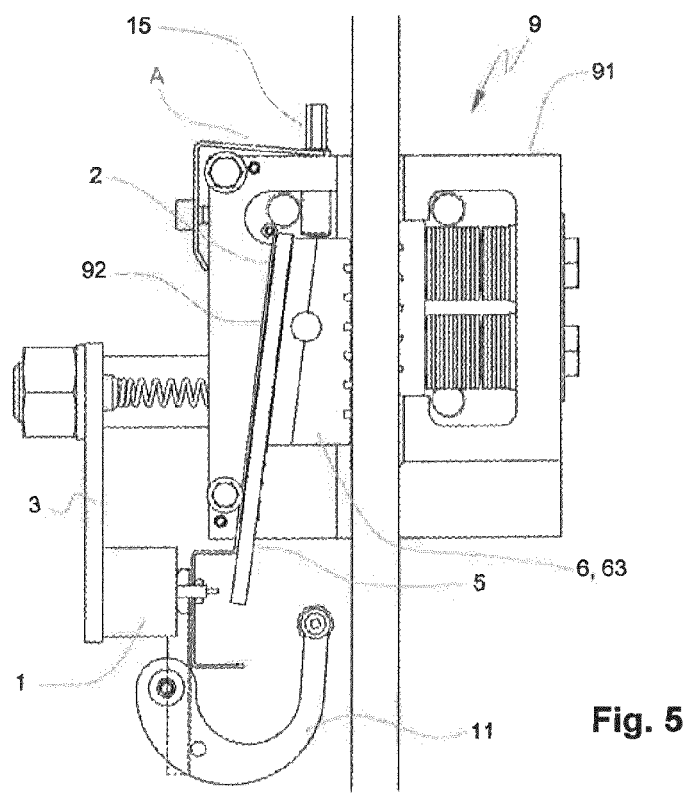
FIG. 5 the safety brake from FIG. 2 in the engaged position.

FIG. 5 shows the safety brake 9 of FIG. 2 in its final engaged position. In relation to the brake housing 91, the brake wedge 63 is in its uppermost position. As a result of the press-on force of the brake wedge 63 in the brake housing 91, the roller cage 5 has been raised with it. In its final engaged position, the brake wedge 63 rests against the settable stop 15. The gap between the brake housing 91 and the guide element 2 has become smaller, or entirely closed. The guide element 2 is swiveled by the brake wedge 63 about its swivel axle A into its original rest position. The air-gap between the electromagnet 1 and the plate 3 has become smaller, or entirely closed. The electromagnet 1 can now be energized and enter into mechanical engagement with the plate 3 without an unnecessary application of energy. The activating element 11 is also in the original rest position.

The safety brake 9 is now in the engaged position and further travel in the blocked direction is braked or prevented. However, as soon as the elevator, in its direction of movement, moves upward, or in a direction opposite to the direction of engagement, the brake wedge 63 is driven out of the constriction. Subsequently, under the influence of gravitational forces on the roller cage 5, the brake wedge 63 runs back into its rest position, in which it is immediately ready for deployment again (see FIG. 2), and the roller cage 5 also rolls back into its initial position again.

Figure 6:
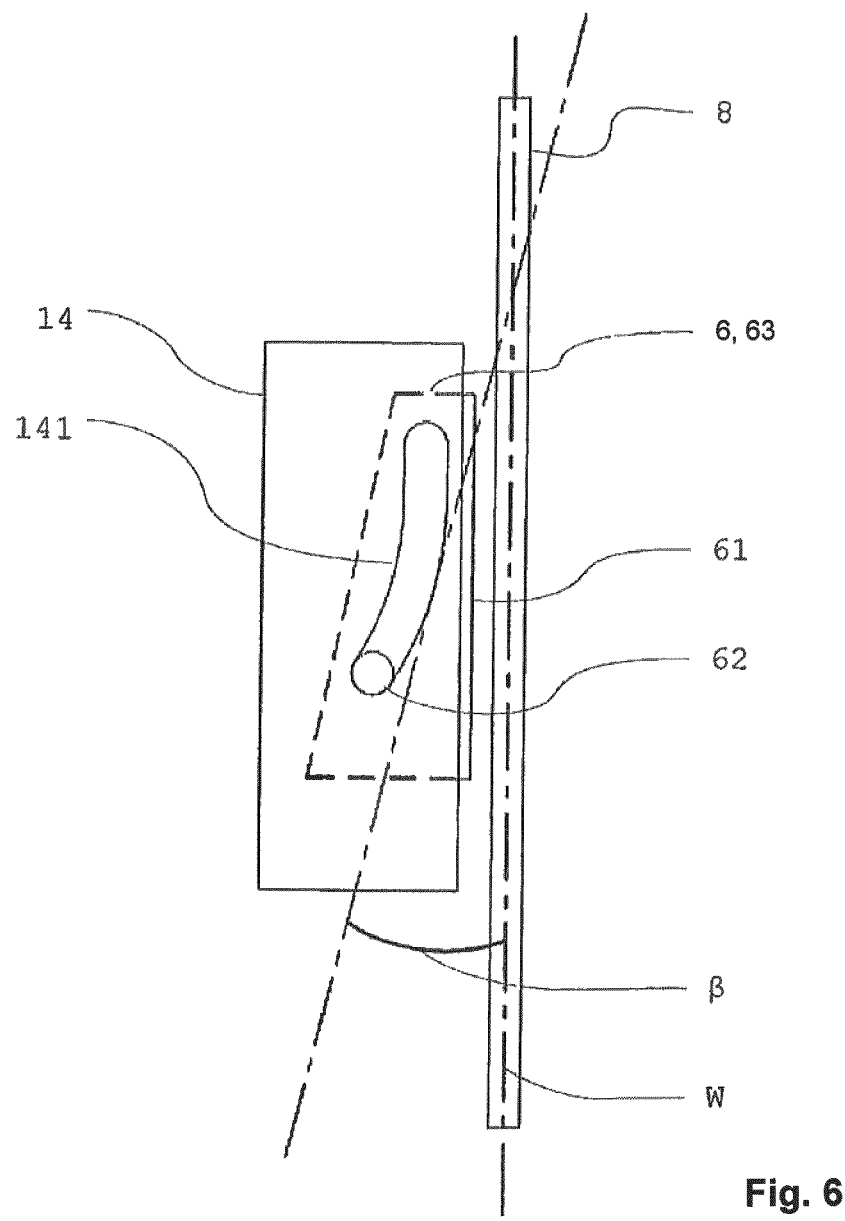
FIG. 6 a diagrammatic illustration of the guide plate of the safety brake from FIG. 1.

FIG. 6 shows the guide plate 14 with its guide contour 141 and the angle β between the working axis W and the guide contour 141. The angle β is essentially identical to the wedge angle α (see FIG. 2). The axis of the guide contour 141 is variable and always defined as the tangent of the contour, the angle β always being determined between this tangent and the guiderail 8. The brake surface 61 of the brake wedge 63 is essentially parallel to the working axis W. The brake wedge 63 has a guide axle 62, which is guided in the guide contour 141. As shown in the present instance, the guide contour 141 is embodied curved towards the working axis W. This favors a very rapid movement of the brake wedge toward the working axis W or guiderail 8.

In some cases, the lower end of the guide element 2, for example, or the fastening of the electromagnet 1, is embodied elastically. Then, with the brake wedge 63 retracted, the guide element 2 can be completely pressed against the pressure surface 92 of the brake housing 91, without the electromagnet being overloaded. Self-evidently, if required, the safety brake can be equipped with sensors, which monitor a position of the brake wedge. The arrangement of the electromagnet 1 and the pressure plate 3 can also be exchanged.

Instead of the brake wedge 63 that is shown in the figures, if necessary, also an engagement, or blocking, roller can be used, or the guidance of the brake wedge, or of the brake element, by means of the guide axle 62 can take place on one side only, so that, for example, the brake element, on the side facing the brake housing, is guided by one surface only.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A safety brake for an elevator comprising:
   a brake element;
   a guide element on which the brake element is displaceably borne, wherein the guide element is moveable between a rest position and a brake initial position;
   a setting device with a pressure element, the pressure element acting on the guide element to move the guide element from the rest position into the brake initial position; and
   an activating element, which, upon activation of the safety brake, is in mechanical engagement with the brake element or is brought into mechanical engagement with the brake element, and by which the brake element is moved in a direction towards an engaged position, wherein the activating element has a roller for mechanical engagement with the brake element and the activating element has a pivot point for the guide element, the pivot point being positioned between a swivel axle of the activating element and the roller.

2. The safety brake according to claim 1 wherein the setting device includes a holding element for holding the guide element prior to activation of the safety brake.

3. The safety brake according to claim 2 wherein the holding element is fastened to the guide element.

4. A safety brake for an elevator comprising:
   a brake element;
   a guide element on which the brake element is displaceably borne, wherein the guide element is moveable between a rest position and a brake initial position;
   a setting device with a pressure element and an electromagnet, the pressure element acting on the guide element to move the guide element from the rest position into the brake initial position, the electromagnet holding the guide element prior to activation of the safety brake; and
   an activating element, which, upon activation of the safety brake, is in mechanical engagement with the brake element or is brought into mechanical engagement with the brake element, and by which the brake element is moved in a direction towards an engaged position.

5. The safety brake according to claim 4 wherein the brake element is a brake wedge with a brake surface and, upon activation of the safety brake, the activating element moves in a direction along the brake surface to move the brake wedge towards the engaged position.

6. The safety brake according to claim 4 wherein upon activation of the safety brake, the guide element is brought into mechanical engagement with the activating element or the activating element is fastened to a brake housing for swiveling and is pivotable with the guide element.

7. The safety brake according to claim 4 wherein the activating element has a roller for mechanical engagement with the brake element.

8. The safety brake according to claim 4 wherein the pressure element is a helical spring.

9. The safety brake according to claim 4 including an adjusting device for setting a pressure force applied by the pressure element on the guide element.

10. The safety brake according to claim 4 including a guide plate with a guide contour for guiding movement of the brake element.

11. The safety brake according to claim 10 wherein the guide contour extends at a wedge angle to a working axis of the safety brake.

12. The safety brake according to claim 11 wherein the guide contour has an at least partly curved contour relative to the working axis.

13. An elevator having a safety brake according to claim 4 for braking an elevator car or a counterweight.

14. A safety brake for an elevator comprising:
    a brake element;
    a guide element on which the brake element is displaceably borne, wherein the guide element is moveable between a rest position and a brake initial position;
    a setting device with a pressure element, the pressure element acting on the guide element to move the guide element from the rest position into the brake initial position;
    an activating element, which, upon activation of the safety brake, is in mechanical engagement with the brake element or is brought into mechanical engagement with the brake element, and by which the brake element is moved in a direction towards an engaged position; and
    a brake plate borne on a spring assembly, wherein a guiderail can be arranged between the brake element and the brake plate.

15. The safety brake according to claim 14 wherein the brake element is a brake wedge with a brake surface and, upon activation of the safety brake, the activating element moves in a direction along the brake surface to move the brake wedge towards the engaged position.

16. The safety brake according to claim 14 wherein upon activation of the safety brake, the guide element is brought into mechanical engagement with the activating element or the activating element is fastened to a brake housing for swiveling and is pivotable with the guide element.

17. The safety brake according to claim 14 wherein the activating element has a roller for mechanical engagement with the brake element.

18. The safety brake according to claim 14 wherein the setting device includes a holding element for holding the guide element prior to activation of the safety brake.

19. The safety brake according to claim 18 wherein the holding element is fastened to the guide element.

20. The safety brake according to claim 14 wherein the pressure element is a helical spring.

21. The safety brake according to claim 14 including an adjusting device for setting a pressure force applied by the pressure element on the guide element.

22. The safety brake according to claim 14 including a guide plate with a guide contour for guiding movement of the brake element.

23. The safety brake according to claim 22 wherein the guide contour extends at a wedge angle to a working axis of the safety brake.

24. The safety brake according to claim 23 wherein the guide contour has an at least partly curved contour relative to the working axis.

25. A method for moving a brake element of an elevator safety brake into an engaged position comprising the steps of:
   bringing a guide element, with the brake element movably borne thereon, from a rest position into a brake initial position using a pressure element of a setting device;
   upon activation of the safety brake, moving the brake element using an activating element in a direction of an engaged position;
   upon activation of the safety brake, bringing the guide element into mechanical engagement with the activating element; and
   bringing the guide element into the rest position through the movement of the brake element into the engaged position.

26. A method for moving a brake element of an elevator safety brake into an engaged position comprising the steps of:
   bringing a guide element, with the brake element movably borne thereon, from a rest position into a brake initial position using a pressure element of a setting device;
   upon activation of the safety brake, moving the brake element using an activating element in a direction of an engaged position;
   until activation of the safety brake, holding the guide element in the rest position with a holding element;
   upon deactivation of the holding element, using the setting device to push the guide element into the brake initial position;
   after a release of the safety brake and upon retraction from the brake initial position into the engaged position, pushing the guide element into the rest position; and
   after reaching the rest position, holding the guide element in the rest position using the holding element.

* * * * *